United States Patent
Ohara et al.

(10) Patent No.: US 11,891,785 B2
(45) Date of Patent: Feb. 6, 2024

(54) FAUCET APPARATUS

(71) Applicant: TOTO LTD., Kitakyushu (JP)

(72) Inventors: Yutaro Ohara, Kitakyushu (JP); Hiroshi Mizoguchi, Kitakyushu (JP)

(73) Assignee: TOTO LTD., Kitakyushu (JP)

( * ) Notice: Subject to any disclaimer, the term of this patent is extended or adjusted under 35 U.S.C. 154(b) by 412 days.

(21) Appl. No.: 17/181,846

(22) Filed: Feb. 22, 2021

(65) Prior Publication Data
US 2021/0270021 A1    Sep. 2, 2021

(30) Foreign Application Priority Data

Feb. 27, 2020 (JP) ................ 2020-031418

(51) Int. Cl.
| | | |
|---|---|---|
| *E03C 1/084* | (2006.01) | |
| *B01F 23/232* | (2022.01) | |
| *B01F 25/314* | (2022.01) | |
| *B01F 23/237* | (2022.01) | |
| *B01F 101/48* | (2022.01) | |

(52) U.S. Cl.
CPC ............ *E03C 1/084* (2013.01); *B01F 23/232* (2022.01); *B01F 25/31423* (2022.01); *B01F 23/237611* (2022.01); *B01F 2101/48* (2022.01)

(58) Field of Classification Search
CPC .. E03C 1/084; B01F 25/31423; B01F 23/232; B01F 23/237611
USPC ............................................................ 4/678
See application file for complete search history.

(56) References Cited

U.S. PATENT DOCUMENTS

| | | | | |
|---|---|---|---|---|
| 3,672,574 A | * | 6/1972 | Knapp ................ | E03C 1/084 239/590.3 |
| 2003/0029935 A1 | | 2/2003 | Takeshi et al. | |
| 2011/0240767 A1 | | 10/2011 | Kitaura et al. | |

FOREIGN PATENT DOCUMENTS

| | | | | |
|---|---|---|---|---|
| CN | 102206946 A | | 10/2011 | |
| CN | 109424018 A | * | 3/2019 | ............ E03C 1/084 |
| JP | 2019-56273 A | | 4/2019 | |
| WO | 01/68995 A1 | | 9/2001 | |

OTHER PUBLICATIONS

Notice of Reasons for Refusal issued in Japanese Patent Application No. 2020-031418, dated Aug. 24, 2021, with English translation.

* cited by examiner

*Primary Examiner* — Tuan N Nguyen
(74) *Attorney, Agent, or Firm* — BakerHostetler (57) ABSTRACT

The object of the present invention is to provide a faucet apparatus in which both the area for the air inlet port and the area for the babble-water flow discharge port are secured, without excessively increasing sizes of a faucet aerator cap and a faucet apparatus. The air inlet port is provided in a lateral surface of the faucet aerator cap. The flow channel of the spout is provided with a communication port for guiding air between the outside wall and the flow channel toward the air inlet port.

7 Claims, 5 Drawing Sheets

FAUCET APPARATUS

CROSS-REFERENCE TO RELATED APPLICATION

This application claims benefit of priority to Japanese Patent Application No. 2020-031418, filed Feb. 27, 2020, the entire content of which is incorporated herein by reference.

FIELD OF THE INVENTION

The present invention pertains to a faucet apparatus in which a faucet aerator cap is installed.

BACKGROUND OF THE INVENTION

Conventionally, there has been known a faucet apparatus in which a faucet aerator cap is installed. In general, a faucet aerator cap has: a water inlet port for taking water into an inside space part of the faucet aerator cap; an air inlet port for taking air into the inside space part by means of flow of the water, and a babble-water flow discharge port for discharging a babble-water flow formed in the inside space part (see WO 01/068995, for example).

In a conventional faucet apparatus as shown in WO 01/068995, an air inlet port takes outside air through a communication port formed on a discharge-port side of the faucet apparatus (in a surface in which a babble-water flow discharge port is provided). In this type of faucet apparatus, if an area for the communication port is secured for sufficient air to be taken, an area for the babble-water flow discharge port is limited, which makes difficult to discharge a desired amount of babble-water. On the other hand, if the area for the babble-water flow discharge port is secured for a sufficient amount of babble-water to be discharged, the area for the communication port is limited, which makes difficult to take a desired amount of air into an inside space part of a faucet aerator cap. In order to secure both the area for the communication port and the area for the babble-water flow discharge port, the faucet aerator cap including the communication port and the babble-water flow discharge port and thus the faucet apparatus have to be large sized. When the faucet aerator cap and the faucet apparatus are large sized, a degree for freedom of design thereof may be limited.

WO 01/068995 is cited as a prior art document.

SUMMARY OF THE INVENTION

Technical Problem

The present invention has been made under the above background. The object of the present invention is to provide a faucet apparatus which can take sufficient air into an air inlet port without excessively increasing sizes of a faucet aerator cap and a faucet apparatus.

Solution to Problem

According to the first aspect of the present invention, a faucet apparatus includes: a spout having an outside wall and a flow channel for water; and a faucet aerator cap installed on an outlet side of the flow channel; wherein the faucet aerator cap has: an inside-space part in which an inside space is defined; a water inlet port provided at an end on an upstream side of the faucet aerator cap, for taking water into the inside space part of the faucet aerator cap; an air inlet port for taking air into the inside space part of the faucet aerator cap, by means of flow of the water; and a babble-water flow discharge port provided at an end on an downstream side of the faucet aerator cap, for discharging a babble-water flow formed in the inside space part of the faucet aerator cap; the air inlet port is provided in a lateral surface of the faucet aerator cap, and a part on the outlet side of the flow channel is provided with a communication port for guiding air between the outside wall and the flow channel toward the air inlet port.

According to the above faucet apparatus, since the air inlet port is provided in the lateral surface of the faucet aerator cap and the part on the outlet side of the flow channel is provided with the communication port for guiding the air between the outside wall and the flow channel toward the air inlet port, even if an area for the air inlet port is secured for sufficient air to be taken, an area for the babble-water flow discharge port is hardly limited. Therefore, without excessively increasing the sizes of the faucet aerator cap and thus the faucet apparatus, both the area for the air inlet port and the area for the babble-water flow discharge port can be secured. In other words, a constant amount of air to be mixed can be secured while a sufficient width of the babble-water flow is secured.

According to the second aspect of the present invention, it is preferable that the part on the outlet side of the flow channel is formed by a spout fitting member.

According to the above feature, since the part on the outlet side of the flow channel is formed by the spout fitting member and provided with the communication port for guiding the air between the outside wall and the flow channel toward the air inlet port, even if an area for the air inlet port is secured for sufficient air to be taken, an area for the babble-water flow discharge port is hardly limited. Therefore, without excessively increasing the sizes of the faucet aerator cap and thus the faucet apparatus, both the area for the air inlet port and the area for the babble-water flow discharge port can be secured. In other words, a constant amount of air to be mixed can be secured while a sufficient width of the babble-water flow is secured.

According to the third aspect of the present invention, it is preferable that the air inlet port and the communication port are arranged at positions which are at least partially out of alignment.

According to the above feature, even when a part of the bubble-water flow undesirably flows out from the air inlet port after passing through the inside space of the faucet aerator cap, due to an inner wall of the spout fitting member, it is curbed that the part of the bubble-water flow undesirably flows out from the faucet apparatus.

According to the third aspect of the present invention, it is preferable that the faucet aerator cap has a threadedly engaging part through which the faucet aerator cap is installed on the spout fitting member and that a plurality of air inlet ports is provided in the lateral surface of the faucet aerator cap, discretely in a circumferential direction.

According to the above feature, the faucet aerator cap is simply and easily installed on the spout fitting member through the threadedly engaging part. Herein, in general, it is difficult to position the threadedly engaging part in a circumferential direction. However, since the plurality of air inlet ports is provided in the lateral surface of the faucet aerator cap discretely in a circumferential direction, air can be taken through the plurality of air inlet ports in their discrete directions. Therefore, although the faucet aerator cap is installed through the threadedly engaging part, air can be surely taken.

According to the fourth aspect of the present invention, it is preferable that the faucet aerator cap has a plurality of columns for defining the plurality of air inlet ports, that the threadedly engaging part has a first cylindrical base and a screw pattern provided on a circumference of the first cylindrical base, and that the plurality of columns is positioned on a more center side in a radical direction than a rood diameter of the screw pattern.

According to the above feature, since the plurality of columns is positioned on the more center side in the radical direction than the rood diameter of the screw pattern of the threadedly engaging part, when the threadedly engaging part is threadedly engaged with the spout fitting member, the plurality of air inlet ports is communicated with each other through a space outer than the plurality of columns. As a result, air can be taken in more easily through the plurality of air inlet ports in the plurality of directions. Thus, although the plurality of air inlet ports is provided in the lateral surface of the faucet aerator cap, air can be surely taken.

According to the fifth aspect of the present invention, it is preferable that the plurality of columns is connected to the threadedly engaging part on one side thereof and is connected to a second cylindrical part on the other side thereof, and that the second cylindrical part is positioned on a more center side in the radical direction than the rood diameter of the screw pattern.

According to the above feature, since the second cylindrical part is positioned on the more center side in the radical direction than the rood diameter of the screw pattern, when the threadedly engaging part is threadedly engaged with the spout fitting member, air can be taken in more easily through a space outer than the second cylindrical part. Thus, although the plurality of air inlet ports is provided in the lateral surface of the faucet aerator cap, air can be surely taken.

According to the sixth aspect of the present invention, it is preferable that the plurality of columns is positioned on a more center side in the radical direction than the second cylindrical part.

According to the above feature, air taken in through the space outer than the second cylindrical part flows into the space outer than the plurality of columns, which is larger than the former space. Then, through the space outer than the plurality of columns, the air can flow into the inside space of the faucet aerator cap through the plurality of air inlet ports efficiently. Thus, although the plurality of air inlet ports is provided in the lateral surface of the faucet aerator cap, air can be surely taken.

According to the seventh aspect of the present invention, it is preferable that the plurality of air inlet ports is positioned further away from the babble-water flow discharge port than the threadedly engaging part.

According to the above feature, the air taken in through the plurality of air inlet ports can be mixed with the water using a space area in the inside space at which the threadedly engaging part is provided. This prevents bubbling (aeration) from being made uneven, without necessity of enlarging the size of the faucet aerator cap in an axial direction.

Advantageous Effects of Invention

According to one feature of the present disclosure, it is possible to provide a faucet aerator cap and a faucet apparatus in which both the area for the air inlet port and the area for the babble-water flow discharge port can be secured, without excessively increasing the sizes of the faucet aerator cap and the faucet apparatus.

DETAILED DESCRIPTION OF THE PREFERRED EMBODIMENT

With reference to the attached drawings, we explain a faucet apparatus according to an embodiment of the present invention. Through the drawings, the same components are accompanied with the same numerical signs, and overlapped explanation is not repeated.

Figure 1:
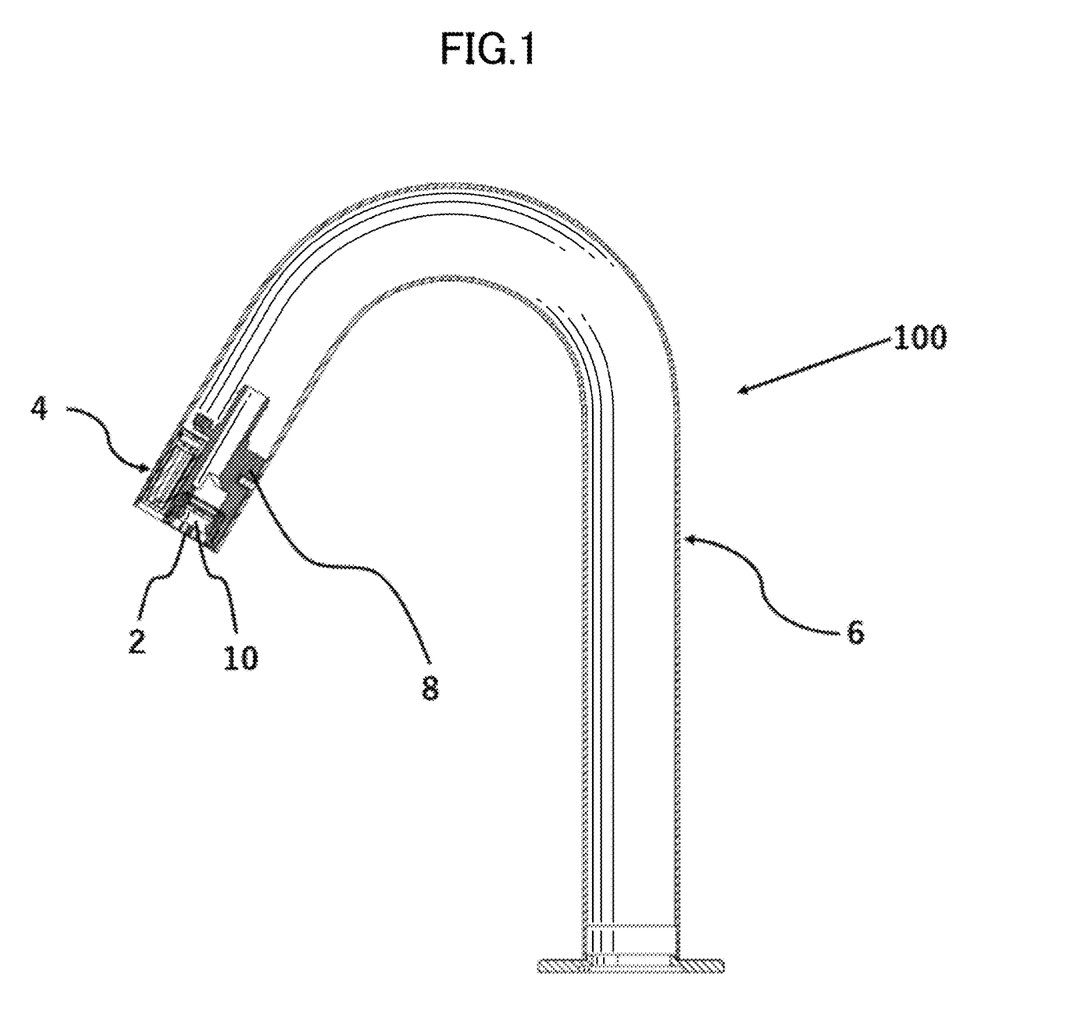
FIG. 1 is a schematic longitudinal section view showing a faucet apparatus according to an embodiment of the present invention.
Figure 2:
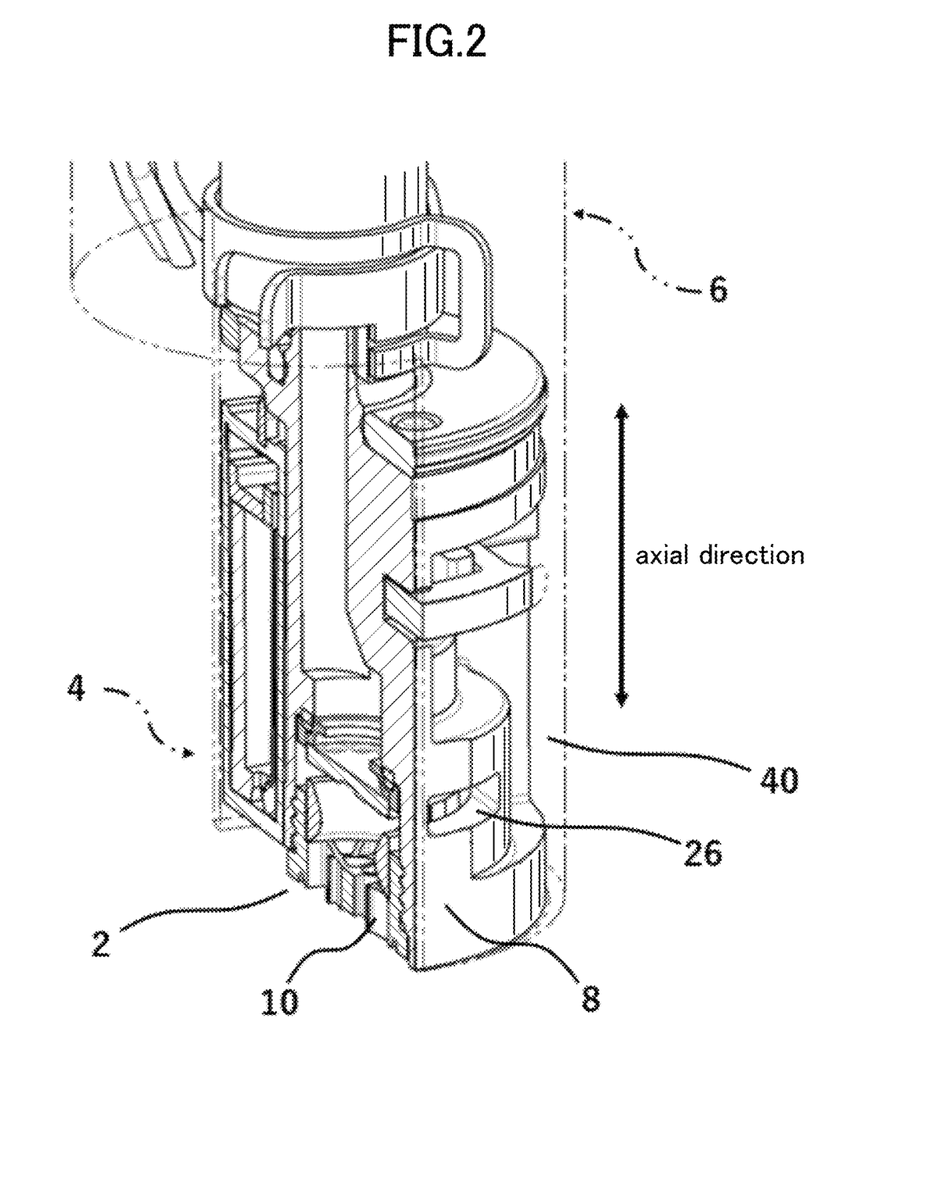
FIG. 2 is a schematic partially longitudinal section view showing a water discharge port and its vicinity of the faucet apparatus shown in FIG. 1.

FIG. 1 is a schematic longitudinal section view showing a faucet apparatus according to an embodiment of the present invention. FIG. 2 is a schematic partially longitudinal section view showing a water discharge port and its vicinity of the faucet apparatus shown in FIG. 1. As shown in FIGS. 1 and 2, the faucet apparatus 100 according to the present embodiment has: a water discharge part 4 in which a water discharge port 2 is formed; a spout 6 having the water discharge part 4; a spout fitting member 8 attached on the water discharge port 2; and a faucet aerator cap 10 installed on an inside of the spout fitting member 8. According to an operation by a user, the faucet apparatus 100 can discharge water, obtained from a water supply source, from the water discharge port 2 through a hose member (not shown), the spout fitting member 8 and the faucet aerator cap 10. The "operation by a user" means, for example, an operation of a manipulation handle (not shown) by a user, or a detection of a user's hand movement by a human body detection sensor installed at the water discharge part 4.

Figure 3:
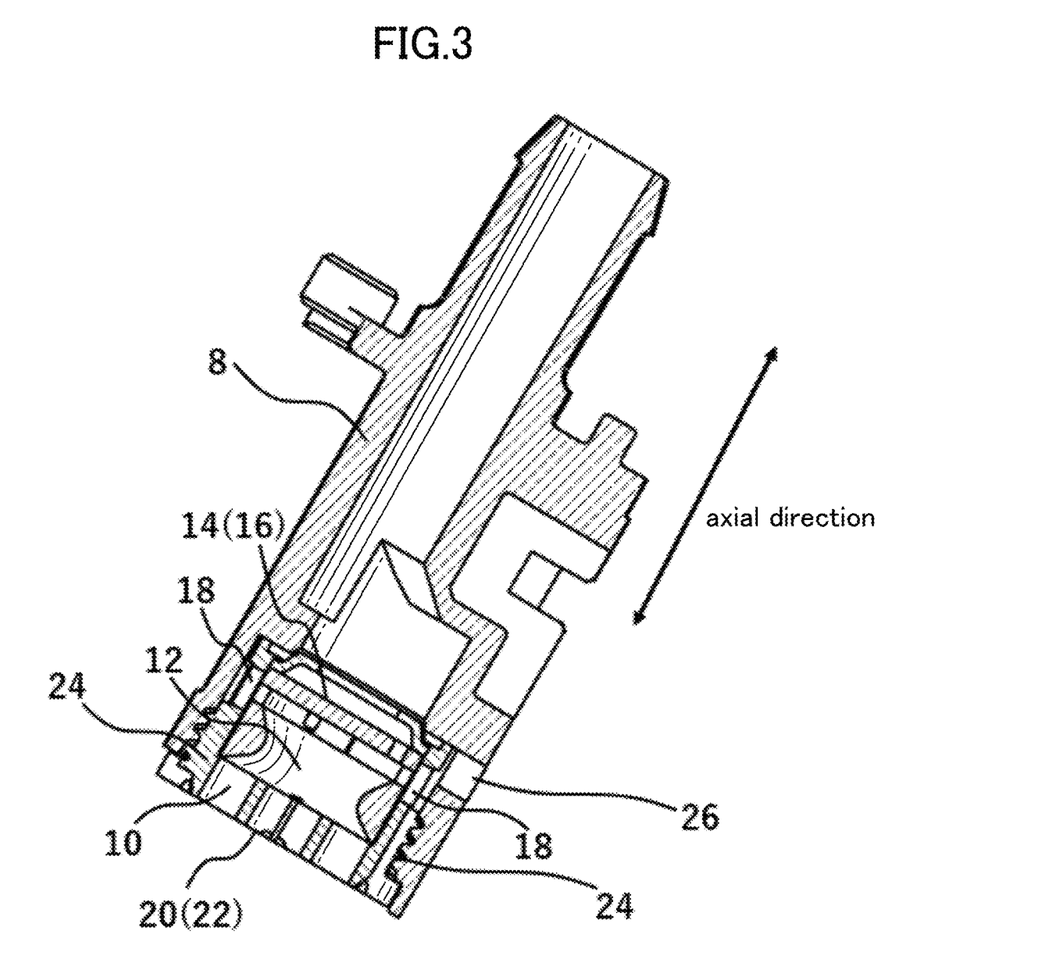
FIG. 3 is a schematic longitudinal section view showing a spout fitting member and a faucet aeration cap of the faucet apparatus shown in FIG. 2.

FIG. 3 is a schematic longitudinal section view showing a spout fitting member and a faucet aeration cap of the faucet apparatus shown in FIG. 2. As shown in FIG. 3, the faucet aerator cap 10 has: an inside-space part 12 in which an inside space is defined; a water inlet port 16 for taking water into the inside space part 12 of the faucet aerator cap 10; an air inlet port 18 for taking air into the inside space part 12 of the faucet aerator cap 10, by means of flow of the water; and a babble-water flow discharge port 22 for discharging a babble-water flow formed in the inside space part 12 of the faucet aerator cap 10. The water inlet port 16 is provided at an end 14 on an upstream side of the faucet aerator cap 10. The babble-water flow discharge port 22 is provided at an end 20 on an downstream side of the faucet aerator cap 10. The air inlet port 18 is provided in a lateral surface of the faucet aerator cap 10. In detail, the air inlet port 18 is provided in a lateral wall of the faucet aerator cap 10 between the upstream side end 14 and the downstream side end 20 of the faucet aerator cap 10.

According to an operation by a user, water flows from an upstream side of the spout fitting member 8 into the faucet aerator cap 10. Then, the water flows from the water inlet port 16 of the faucet aerator cap 10 into the inside space part 12. Herein, due to this flow of the water into the inside space part 12, air is taken through the air inlet ports 18 into the inside space part 12. The air taken into the inside space part 12 is mixed with the water in the inside space part 12, so that the babble-water flow is formed in the inside space part 12. The babble-water flow formed in the inside space part 12 flows out from the faucet aerator cap 10 through the babble-water flow discharge port 22 (which is the water discharge port 2 of the faucet apparatus 100).

A lateral surface of the spout fitting member 8 is provided with a communication port 26 for guiding air between an outside wall of the spout 6 and the spout fitting member 8 (a part on an outlet side of a flow channel) toward the air inlet ports 18 of the faucet aerator cap 10. The space between the outside wall of the spout 6 and the spout fitting member 8 is communicated with the outside space of the spout 6 through one or more gaps (not shown) of the spout 6. The term "communicate" means that the two elements or spaces are connected with each other so that air passes from one to the other. The one or more gaps of the spout 6 is formed in such a manner that air is sufficiently taken in through the air inlet ports 18 due to the flow of the water into the inside space part 12.

As described above, according to the present embodiment, the air inlet ports 18 are provided in the lateral surface of the faucet aerator cap 10 and the lateral surface of the spout fitting member 8 is provided with the communication port 26 for guiding the air in an air channel 40 between the outside wall of the spout 6 and the spout fitting member 8 toward the air inlet ports 18. Thus, even if an area for the air inlet ports 18 is secured for sufficient air to be taken, an area for the babble-water flow discharge port 22 (the water discharge port 2 of the faucet apparatus 100) is hardly limited. Therefore, without the necessity of excessively increasing the sizes of the faucet aerator cap 10 and thus the faucet apparatus 100, both the area for the air inlet ports 18 and the area for the babble-water flow discharge port 22 can be surely secured. In other words, a constant amount of air to be mixed can be secured while a sufficient width of the babble-water flow is secured.

In addition, the faucet aerator cap 10 has a threadedly engaging part 24, through which the faucet aerator cap 10 is installed on the spout fitting member 8. Thereby, the faucet aerator cap 10 is threadedly engaged with the spout fitting member 8. The threadedly engaging part 24 is positioned on a downstream side of the air inlet ports 18. That is to say, the air inlet ports 18 are positioned on an upstream side of the threadedly engaging part 24. In other words, the air inlet ports 18 are positioned further away from the babble-water flow discharge port 22 than the threadedly engaging part 24. Due to this structure, the faucet aerator cap 10 is easily installed on the water discharge port 2 of the faucet apparatus 100. Besides, the threadedly engaging part 24 is positioned on a downstream side of the communication hole 26 of the spout fitting member 8 in an axial direction.

As described above, the air inlet ports 18 are positioned on the upstream side of the threadedly engaging part 24. Thus, the air taken in through the plurality of air inlet ports 18 can be mixed with the water using a space area in the inside space part 12 of the faucet aerator cap 10 at which the threadedly engaging part 24 is provided. This prevents bubbling (aeration) from being made uneven, without necessity of enlarging the size of the faucet aerator cap 10 in an axial direction.

Figure 4:
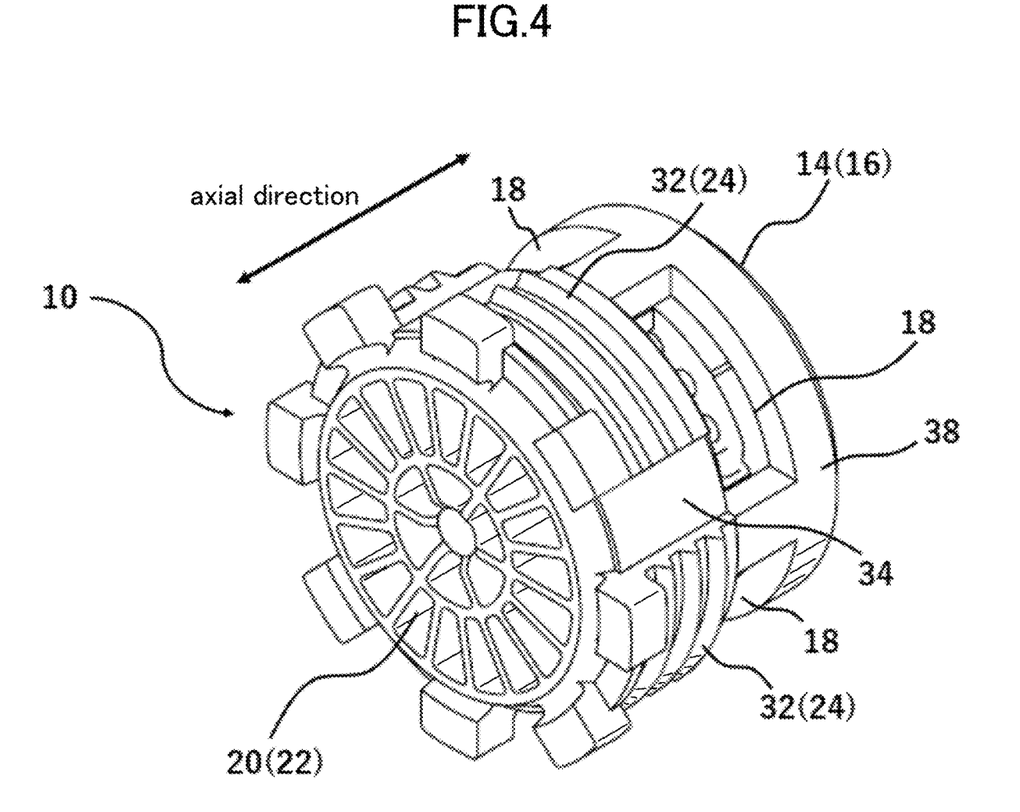
FIG. 4 is a schematic perspective view showing the faucet aeration cap shown in FIG. 3.
Figure 5:
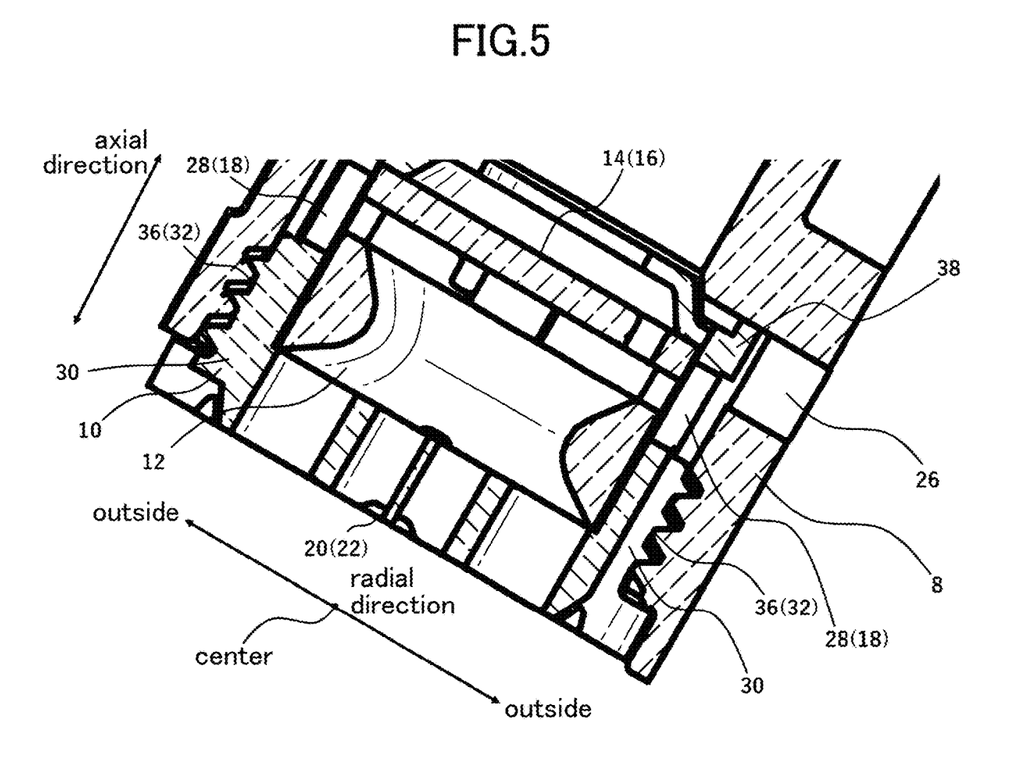
FIG. 5 is a schematic partially longitudinal section view showing the spout fitting member and the faucet aeration cap shown in FIG. 3.

FIG. 4 is a schematic perspective view showing the faucet aeration cap shown in FIG. 3. FIG. 5 is a schematic partially longitudinal section view showing the spout fitting member and the faucet aeration cap shown in FIG. 3. As shown in FIGS. 4 and 5, the air inlet ports 18 and the communication port 26 are arranged at positions which are at least partially out of alignment in an axial direction. In the present embodiment, for example, it is preferable that a range of the air inlet ports 18 which is overlapped with the communication hole 26 is 50% or less in the axial direction, As described above, according to the present embodiment, the air inlet ports 18 and the communication port 26 are arranged at the positions which are at least partially out of alignment in the axial direction. Thus, when a part of the bubble-water flow undesirably flows out from the air inlet ports 18 toward the spout fitting member 8 after passing through the inside space part 12 of the faucet aerator cap 10, due to an inner wall of the spout fitting member 8, it is curbed that the part of the bubble-water flow undesirably leaks out from the faucet apparatus 100.

In addition, at least a part of the air taken in through the communication hole 26 collides with an outer wall of the faucet aerator cap 10 to be diffused in a circumferential direction. This also prevents the bubbling (aeration) from being made uneven, because the air is taken in not through a limited part of the air inlet ports 18 but through the whole air inlet ports 18.

Herein, it is preferable that the air inlet ports 18 are overlapped with the communication hole 26 only on an upstream side of the air inlet ports 18, and that the air inlet ports 18 are not overlapped with the communication hole 26 on a downstream side of the air inlet ports 18. If this configuration is adopted, due to the inner wall of the spout fitting member 8, it is further curbed that a part of the bubble-water flow undesirably leaks out from the faucet apparatus 100. In addition, diffusion of the taken air in the circumferential direction is also promoted, which further prevents the bubbling (aeration) from being made uneven.

The air inlet ports 18 are provided in the lateral surface of the faucet aerator cap 10, discretely in a circumferential direction of the faucet aerator cap 10. In detail, the air inlet ports 18 are arranged in alignment at substantially regular intervals in the circumferential direction.

As described above, the faucet aerator cap 10 is threadedly engaged with the spout fitting member 8. In general, through this threadedly engaged connection, it is difficult to position the faucet aerator cap 10 with respect to the spout fitting member 8 regarding the circumferential direction of the faucet aerator cap 10. However, since the plurality of air inlet ports 18 is provided in the lateral surface of the faucet aerator cap 10 in alignment at substantially regular intervals in the circumferential direction of the faucet aerator cap 10, air can be taken in through the plurality of air inlet ports 18 in their discrete directions. Therefore, although the faucet aerator cap 10 is installed through the threadedly engaged connection, air can be surely taken in the plurality of directions, which further prevents the bubbling (aeration) from being made uneven.

The faucet aerator cap 10 has a plurality of columns 28 for defining (partitioning) the plurality of air inlet ports 18. The plurality of columns 28 is arranged in the lateral surface of the faucet aerator cap 10 at substantially regular intervals in the circumferential direction of the faucet aerator cap 10. The "substantially regular intervals" mean that misalignment (margin of error) of a gap between adjacent two columns 28 (a circumferential length of the air inlet port 18 therebetween) is not more than 1 mm.

The threadedly engaging part 24 has a first cylindrical base 30 and a screw pattern 32 provided on a circumference (an outer surface) of the first cylindrical base 30. The first cylindrical base 30 is a side wall of the threadedly engaging part 24 of the faucet aerator cap 10, and is formed over the whole circumferential surface of the threadedly engaging part 24. On the other hand, the screw pattern 32 is not formed over the whole circumferential surface of the threadedly engaging part 24. That is to say, the threadedly engaging part 24 has a non-screw portion 34 provided on another circumference (another outer surface) of the first cylindrical base 30.

The plurality of columns 28 is formed to be positioned on a more center side in a radical direction than a rood diameter 36 of the screw pattern 32. The non-screw portion 34 is also formed to be positioned on a more center side in the radical direction than the rood diameter 36 of the screw pattern 32. Furthermore, the plurality of columns 28 and the non-screw portion 34 are formed to be positioned at substantially the same positions in the radial direction. The "substantially the same positions in the radial direction" mean that misalignment (margin of error) between the plurality of columns 28 and the non-screw portion 34 in the radial direction is not more than 0.2 mm.

Since the plurality of columns 28 is positioned on the more center side in the radical direction than the rood diameter 36 of the screw pattern 32 of the threadedly engaging part 24, when the threadedly engaging part 24 is threadedly engaged with the spout fitting member 8, the plurality of air inlet ports 18 is communicated with each other through a space outer than the plurality of columns 28. As a result, air can be taken in more easily through the plurality of air inlet ports 18 in the plurality of directions. Thus, although the plurality of air inlet ports 18 is provided in the lateral surface of the faucet aerator cap 10, air can be surely taken.

In addition, the faucet aerator cap 10 has a second cylindrical base 38, which is provided opposite to the threadedly engaging part 24 with respect to the air inlet ports 18. Herein, in the present faucet aerator cap 10, the plurality of columns 28 is connected to the threadedly engaging part 24 on one side thereof and is connected to the second cylindrical part 38 on the other side thereof. The second cylindrical part 38 is formed to be positioned on a more center side in the radical direction than the rood diameter 36 of the screw pattern 32.

Since the second cylindrical part 38 is positioned on the more center side in the radical direction than the rood diameter 36 of the screw pattern 32, when the threadedly engaging part 24 is threadedly engaged with the spout fitting member 8, air can be taken in more easily through a space outer than the second cylindrical part 38. Thus, although the plurality of air inlet ports 18 is provided in the lateral surface of the faucet aerator cap 10, air can be surely taken.

At least a portion of the second cylindrical part 38 is positioned to be overlapped with the communication hole 26 in the axial direction. In the present embodiment, the second cylindrical part 38 is positioned to be fully overlapped with the communication hole 26 in the axial direction.

Furthermore, the plurality of columns 28 is formed to be positioned on a more center side in the radical direction than the second cylindrical part 38. The non-screw portion 34 is also formed to be positioned on a more center side in the radical direction than the second cylindrical part 38.

Air taken in through the space outer than the second cylindrical part 38 flows into the space outer than the plurality of columns 28, which is larger than the former space. Then, through the space outer than the plurality of columns 28, the air can flow into the inside space part 12 of the faucet aerator cap 10 through the plurality of air inlet ports 18 efficiently. Thus, although the plurality of air inlet ports 18 is provided in the lateral surface of the faucet aerator cap 10, air can be surely taken.

The embodiment of the present invention was explained above. However, the present invention is not limited by the above description.

As long as the essential features of the present invention are included, any suitable modification or variation of the above embodiment, which might be made by a person skilled in the art, falls within the scope of the present invention. For example, a shape, a size, a material and/or an arrangement of each component included in each installed assembly, such as the faucet apparatus 10, the spout fitting member 8 or the faucet aerator cap 10, are not limited to the above illustrated ones, but may be suitably changed. For example, in the above embodiment, the flow channel consists of the hose member (not shown) and the spout fitting member 8. However, these two components may be integrated to form an integral channel. In addition, in the above embodiment, the flow channel is covered by the outside wall of the spout 8. However, an inside cavity of the outside wall of the spout 8 may be directly used as a flow channel. In addition, each component included in the above embodiment may be combined in any suitable manner as far as it is technically possible. Such a combined structure also falls within the scope of the present invention as long as the essential features of the present invention are included.

What is claimed is:

1. A faucet apparatus comprising:
   a spout having an outside wall and a flow channel for water; and
   a faucet aerator cap installed on an outlet side of the flow channel;
   wherein
   the faucet aerator cap has:
   an inside-space part in which an inside space is defined;
   a water inlet port provided at an end on an upstream side of the faucet aerator cap, for taking water into the inside space part of the faucet aerator cap;
   an air inlet port for taking air into the inside space part of the faucet aerator cap, by means of flow of the water;
   a babble-water flow discharge port provided at an end on a downstream side of the faucet aerator cap, for discharging a babble-water flow formed in the inside space part of the faucet aerator cap;
   the air inlet port is provided in a lateral surface of the faucet aerator cap;
   a part on the outlet side of the flow channel is provided with a communication port for guiding air between the outside wall and the flow channel toward the air inlet port; and
   the air inlet port and the communication port are arranged at positions which are at least partially out of alignment in an axially up-and-down direction such that an upper side of the air inlet port faces the communication port but a lower side of the air inlet port does not face the communication port.

2. The faucet apparatus according to claim 1, wherein the part on the outlet side of the flow channel is formed by a spout fitting member.

3. The faucet apparatus according to claim 2, wherein
the faucet aerator cap has a threadedly engaging part through which the faucet aerator cap is installed on the spout fitting member, and
a plurality of air inlet ports is provided in the lateral surface of the faucet aerator cap, discretely in a circumferential direction.

4. The faucet apparatus according to claim 3, wherein
the faucet aerator cap has a plurality of columns for defining the plurality of air inlet ports,
the threadedly engaging part has a first cylindrical base and a screw pattern provided on a circumference of the first cylindrical base, and
the plurality of columns are positioned on a more center side in a radial direction than a root diameter of the screw pattern.

5. The faucet apparatus according to claim 4, wherein
the plurality of columns are connected to the threadedly engaging part on one side thereof and is connected to a second cylindrical part on the other side thereof, and
the second cylindrical part is positioned on a more center side in the radial direction than the root diameter of the screw pattern.

6. The faucet apparatus according to claim 5, wherein
the plurality of columns are positioned on a more center side in the radial direction than the second cylindrical part.

7. The faucet apparatus according to claim 3, wherein
the plurality of air inlet ports are positioned further away from the babble-water flow discharge port than the threadedly engaging part.

* * * * *

UNITED STATES PATENT AND TRADEMARK OFFICE
CERTIFICATE OF CORRECTION

| | | |
|---|---|---|
| PATENT NO. | : 11,891,785 B2 | |
| APPLICATION NO. | : 17/181846 | |
| DATED | : February 6, 2024 | |
| INVENTOR(S) | : Yutaro Ohara | |

It is certified that error appears in the above-identified patent and that said Letters Patent is hereby corrected as shown below:

In the Claims

In Claim 1, Column 8, Line 47, "air into the inside space" should be -- air into the inside-space --.

In Claim 1, Column 8, Line 51, "flow formed in the inside space" should be -- flow formed in the inside-space --.

Signed and Sealed this
Twenty-eighth Day of May, 2024

*Katherine Kelly Vidal*

Katherine Kelly Vidal
*Director of the United States Patent and Trademark Office*